Dec. 6, 1932.    J. S. GREENE    1,890,324
PHOTOGRAPHIC ROLL HOLDER
Filed Aug. 20, 1924    4 Sheets-Sheet 1
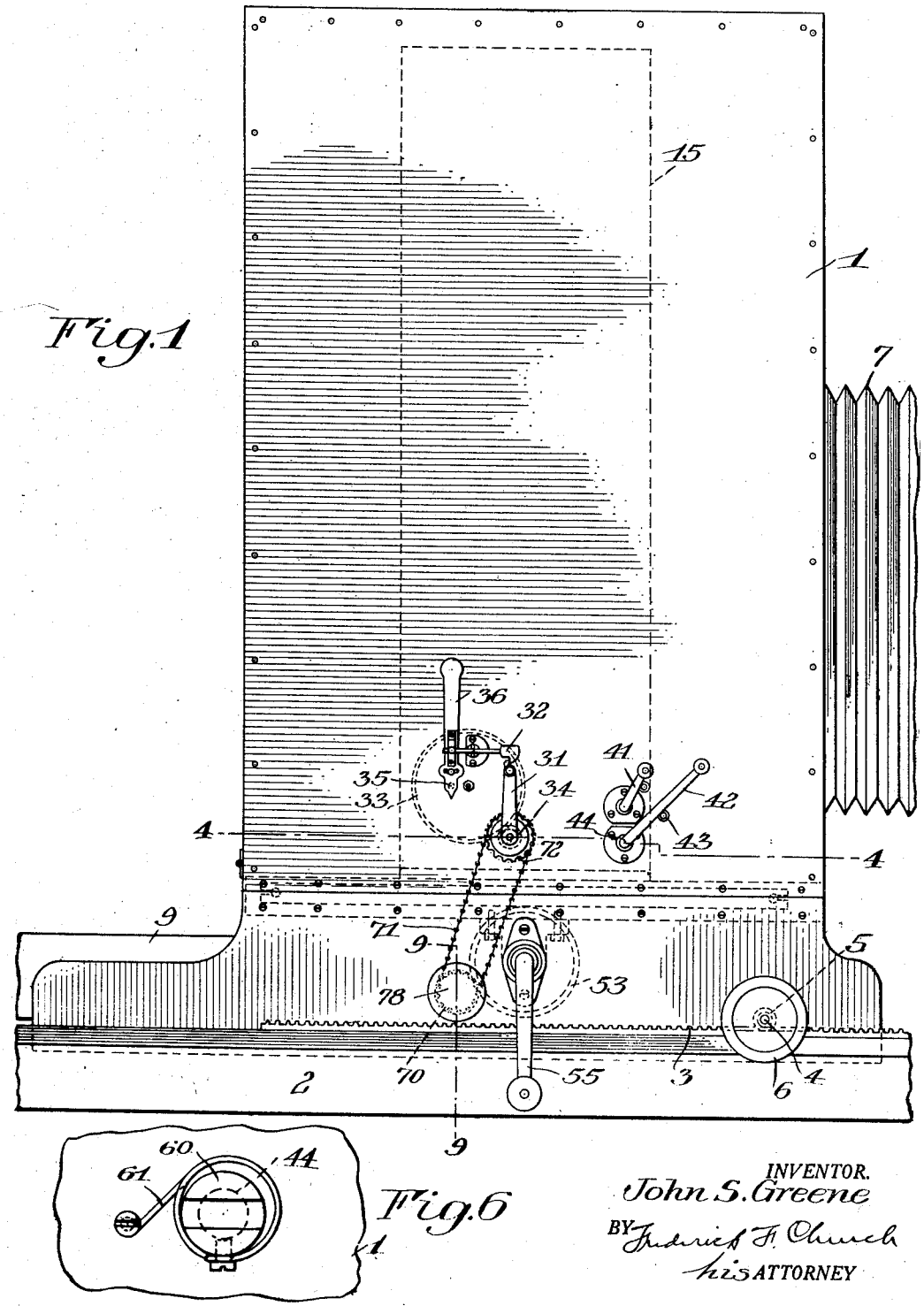
INVENTOR.
John S. Greene
BY Frederick F. Church
his ATTORNEY Dec. 6, 1932.   J. S. GREENE   1,890,324
PHOTOGRAPHIC ROLL HOLDER
Filed Aug. 20, 1924   4 Sheets-Sheet 2
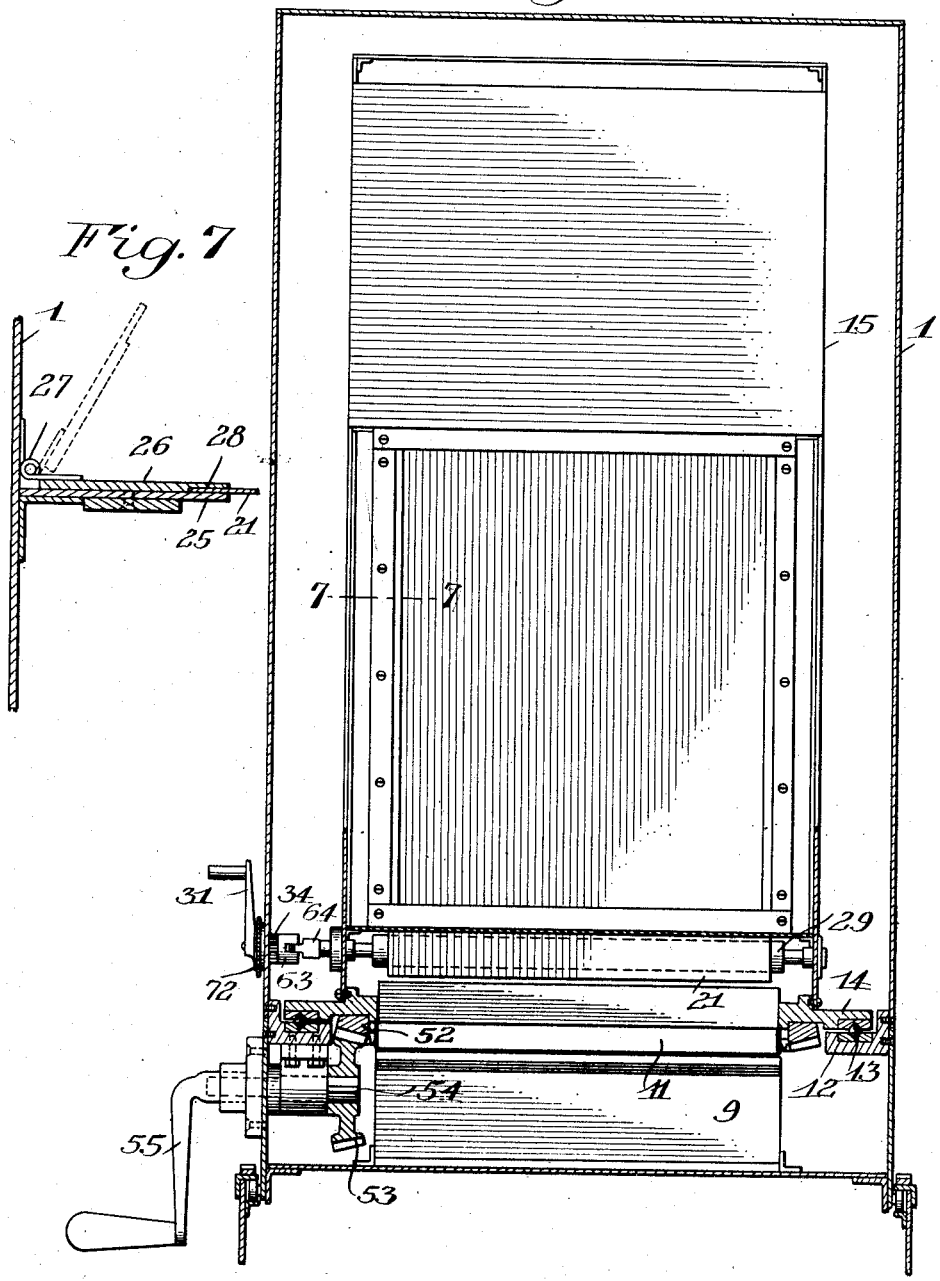
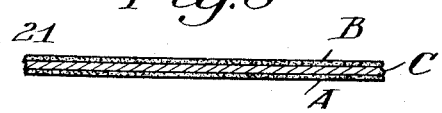
INVENTOR.
John S. Greene
BY Frederick F. Church
his ATTORNEY Dec. 6, 1932.  J. S. GREENE  1,890,324
PHOTOGRAPHIC ROLL HOLDER
Filed Aug. 20, 1924  4 Sheets-Sheet 3
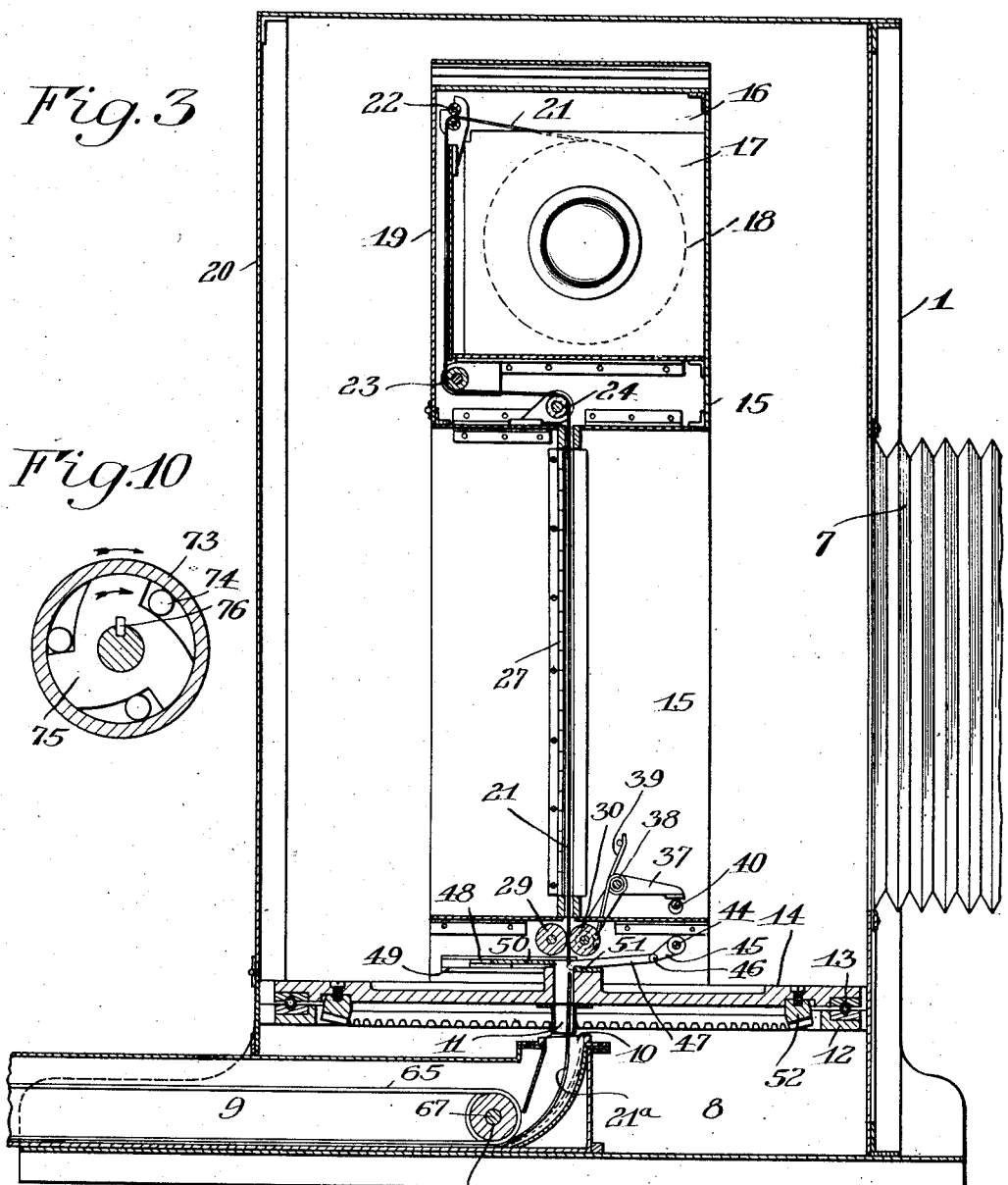

Dec. 6, 1932.            J. S. GREENE            1,890,324
PHOTOGRAPHIC ROLL HOLDER
Filed Aug. 20, 1924       4 Sheets-Sheet 4

INVENTOR.
John S. Greene
BY Fredrick F. Church
his ATTORNEY

Patented Dec. 6, 1932

1,890,324

UNITED STATES PATENT OFFICE

JOHN S. GREENE, OF ROCHESTER, NEW YORK, ASSIGNOR TO PHOTOSTAT CORPORATION, OF PROVIDENCE, RHODE ISLAND, A CORPORATION OF RHODE ISLAND

PHOTOGRAPHIC ROLL HOLDER

Application filed August 20, 1924. Serial No. 733,062.

My present invention relates to photography and more particularly to photographic cameras and it has for its object to provide a camera with a holder for sensitive material which may be reversed to present opposite sides of the same sensitive sheet in the same focal plane. The invention is further directed toward providing a roll holder so mounted as to accomplish these purposes and to details of construction whereby the feeding and cutting of the film is adjusted to the reversing movement of the holder. To these and other ends the invention resides in certain improvements and combinations of parts all as will be hereinafter more fully described, the novel features being pointed out in the claims at the end of the specification.

In the drawings:

Figure 1 is a fragmentary side view of a camera body constructed in accordance with and illustrating one embodiment of my invention;

Figure 2 is a section on the line 2—2 of Figure 1;

Figure 3 is a vertical section on the line 3—3 of Figure 2;

Figure 6 is a detail fragmentary end view of one of the clutch elements;

Figure 7 is an enlarged fragmentary section of the light seal taken on the line 7—7 of Figure 2;

Figure 8 is a fragmentary sectional view of the sensitive element that the camera is designed to expose;

Figure 9 is an enlarged fragmentary detail section taken on the line 9—9 of Figure 1 and Figure 10 is an enlarged section of a clutch element taken on the line 10—10 of Figure 9.

Similar reference numerals throughout the several views indicate the same parts.

Figure 4:
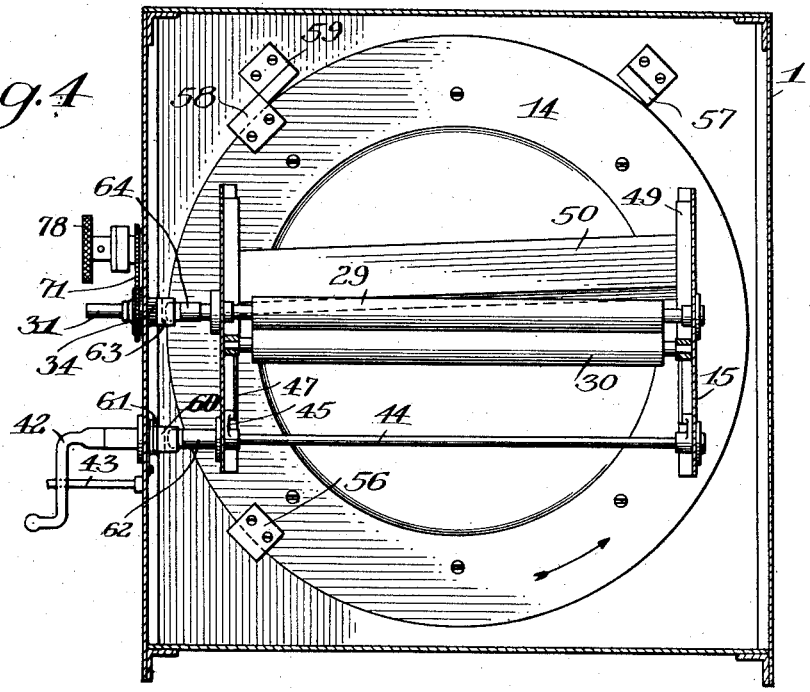
Figure 4 is a horizontal section on the line 4—4 of Figure 1 with the parts in one position.

My present invention is particularly applicable to cameras of the type known as commercial cameras which are used for the purpose of making photographic records of documents, maps, drawings etc. In order to reduce the number of photographic prints required to reproduce a document of several pages, it becomes desirable to use a double coated film or sensitive medium and make two exposures on opposite sides of the same sheet so that one print will carry two photographs instead of one and the combined thickness of the set of prints will be reduced one-half. To accomplish this my present invention contemplates an arrangement whereby a length of film or sensitive material stretched in the focal plane may be exposed on one side and then bodily reversed to receive an exposure on the opposite side.

Cameras of this character are preferably so constructed that the sensitive film is fed intermittently in proper exposure lengths from a continuous roll and cut off print by print. Features of my invention are directed toward providing a film feeding and severing mechanism that will lend itself to a reversal of both the feeding and severing devices along with the reversal of the film itself.

Referring more particularly to the drawings 1 indicates the body of a camera which is movably mounted on a bed 2 for focusing purposes, the bed being provided with a rack 3 and the body with a shaft 4 carrying a pinion 5 meshing therewith and turned by a knob 6. The bellows 7 connect the body with the front (not shown) in the usual manner, the camera being of the type in which the focusing is accomplished by moving the body relatively to the front instead of moving the front relatively to the body.

The body in the present instance is of a sheet metal construction and it is divided into an exposure chamber 7 and a dark chamber 8 located below the latter. In the dark chamber is a dark box 9 that is removable therefrom in a rearward direction in the ordinary manner of such cameras and which has a throat 10 through which a print is received therein. This throat 10 is normally in alignment with a feed slot 11 in the roll holding mechanism from which a print is fed and severed from the continuous roll in the manner hereinafter described.

The dividing line between the two chambers embodies a platform 12 upon which is a ball-bearing 13 carrying a turn table 14. Supported on the turn table is a structure 15 having at its top a roll holding chamber 16. Within this chamber is a removable box 17 containing a film roll 18 that becomes accessible through a door 19 at the rear of the chamber and through a door 20 at the rear of the camera body. The film 21 is fed from the roll 18 over guide rolls 22, downwardly around a guide roll 23 and thence over a guide roll 24 into the focal plane of the camera.

The focal plane is defined by a pair of flanges 25 and 26 projecting from each side wall of the body 1 (Figure 7). The flange 25 is fixed whereas the flange 26 is hinged at 27 to swing from the full line position of Figure 7 to the dotted line position in the first of which positions it confines the film 21 against the flange 25 within a bead 28 and in the latter of which it releases the film for the manipulations necessary to the threading thereof through the camera. It may be here stated that the nature of the film herein contemplated and described is a sheet of paper having a sensitive coating of emulsion on both sides.

After passing down between the fixed and movable flanges 25 and 26 the film is engaged by feed rollers 29 and 30 which are located at the bottom of the film holding structure 15 and which measure off the length of film that has been exposed in the focal plane and within the exposure area of the camera. The feed roll 30 is an idle roll whereas the roll 29 is a driven roll that carries the length of exposure film from the focal plane into the dark box 9. The latter, meaning the roll 29, is operated by a crank handle 31 on the exterior of the camera body. This operating crank 31 is under the control of a detent 32 which acts in conjunction with a cycle member 33 that is in the nature of a gear one revolution of which turns the feed roll 30 a sufficient distance to carry an exposed length of the film out of the focal plane and into the dark box 9. The operating crank 31 is geared to the cycle member 33 through a pinion 34 and an aperture in the cycle member 33 is engaged by a pin 35 on a stop lever 36 to automatically halt the feed. The detent 32 is under the control of the stop member 36 so that the feeding crank 31 is halted after the required number of revolutions. All of this mechanism is no part of the present invention being the ordinary feeding mechanism of a camera of this type except for the fact that under the peculiar construction herein involved, this feeding mechanism is required to have a driving means through which the hand operated devices such as the crank 31 may be connected to and then disconnected from the feeding rolls because of the fact, as previously indicated, that the film is fed an exposure length, is exposed and is then reversed for an exposure on the opposite side before the print is reeled off and severed. The engagement of the pin 35 with an opening in the cycle member 33 allows the detent 32 to snap into the path of the winding crank 31 and terminate the winding movement. To release the crank for another winding movement the lever 36 is pressed to throw out the detent and does not regain its initial position until a cycle has been completed and the pin 35 snatched back into engagement.

In connection with feed rolls 29 and 30 is a tensioning device that embodies a bell crank 37 upon which the roll 30 is carried. This is mounted on a pivot 38 surrounding which is a spring 39 that has a tendency to rock the lever and keep the roll 30 tight against the roll 29. An eccentric 40 engages an arm of the bell crank which later normally rests on the low point thereof. When the eccentric is rotated by means of a crank 41 on the exterior of the camera body (Figure 1), the high point thereof raises the bell crank arm and causes the lever 30 to be withdrawn from contact with the roller 29 thus interrupting the feed and allowing the film to be manipulated between the rolls as during the process of initially threading it to the machine.

Just below the tension crank 41 is a crank 42 that normally rests against the stop pin 43 in a position at the right in Figure 1. This crank is on a shaft 44 having a crank arm 45 provided with a wrist pin 46 connected by a link 47 with a slide 48. The slide operates in a guide 49 and carries a knife 50 which operates across the opening 11 and contacts with a shear plate 51 to cut the film 21 at a point just below the feed rolls 29—30. After each double exposure of each stretch of film that is reeled into the focal plane, the knife slide is operated and the sheet is severed but not however until the exposed sheet has been fed through the openings 10 and 11 by reason of the fact that a new area of film has been fed into the focal plane. Such a severed sheet is shown at 21ª in Figure 3.

All of the described mechanism including the film supporting flanges 25—26 and the structure 15 upon which these are centrally mounted are carried on the turn table 14. On the under side of the latter is a ring gear 52 with which meshes (Figure 2) a bevel pinion 53 on a crank shaft 54 having an exteriorly arranged crank 55. After the film has been exposed on one side, the crank 55 is turned until an abutment 56 (Figures 4 and 5) on the turn table comes in contact with a stop 57 on a fixed portion of the camera body. It is then exposed on the other side and the turn table is then rotated in the opposite direction until another abutment 58 strikes a fixed stop 59 restoring the turn table to its original position. In both positions in which it is stopped it brings one or the other face of the double coated film or paper accurately into the focal plane. A section of the paper used is shown in Figure 8, the double coated faces thereof being shown at A and B and the body or base at C.

Figure 5:
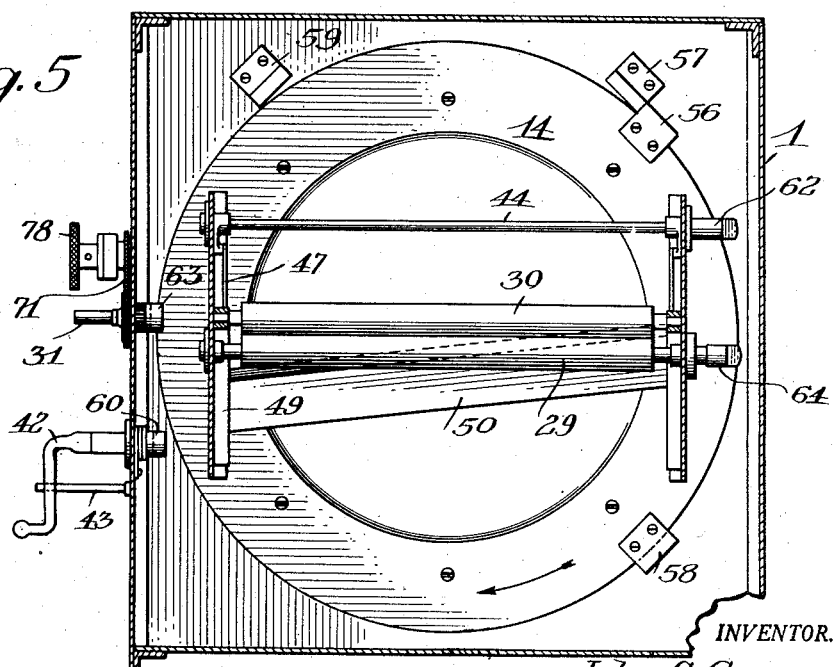
Figure 5 is a similar view with the parts in a different position.

Inasmuch as the operating devices described are mounted in the fixed wall of the camera body whereas the actuated mechanism is movable within the body, clutch devices must be employed for connecting the two for movement. Such a clutch element is shown in Figure 6 being a slotted or female element 60 on the inner end of the knife operating crank shaft 44. A spring 61 cooperating therewith returns the crank to normal position in which the slotted portion is horizontal. When the turn table 14 is rotated 180 degrees to reverse the sensitive sheet and brought back again a male clutch member 62 on the knife shaft 44 disconnects with this clutch member as shown in Figure 5 and then reconnects with it as shown in Figure 4. In the same manner a female clutch member 63 on winding crank 31 cooperates with a male clutch member 64 on the end of the shaft of feed roll 29 inasmuch as the feeding mechanism must also be disconnected while the sensitive material is being reversed.

After an exposed print has been reeled past the feed rolls 29 and 30 and severed, something must be done to get it out of the opening 11 of the turn table 14 before the latter is rotated to reverse the succeeding sheet. The said feed rolls carry the sheet into the dark box 9 to a certain extent but after its introduction the sheet is taken up by an endless frictional rubber carrier 65 traveling over a roller 66 on a shaft 67 which thrusts it along the bottom of the dark box. This shaft 67 is connected by a screw socket 68 with a shaft 69 journalled in the wall of the camera body 1, the detachable connection being for the purpose of permitting the removal of the dark box 9. The shaft 69 carries a sprocket 70 driven by a sprocket chain 71 running over a sprocket 72 on the shaft of the feeding crank 31. This sprocket 70 is formed on one part of an over-running clutch said part consisting of a shell 73 in which are clutch rollers 74 (Figure 10) arranged in pockets in an inner clutch member 75. The latter is keyed at 76 to the shaft 69 and pinned to said shaft at 77 is a knob 78 by which it may be turned directly by hand. The sprocket 70 turns freely on the shaft 69 except when locked by the clutch elements. The result is that when the feed roll 29 is being driven by means of the crank 31, the clutch elements 73 and 75 lock so that the sprocket chain 71 drives the shafts 67 and 69 through the sprocket 70 and in the same direction. Nevertheless, the shafts 67 and 69 may be turned independently by the knob 78 when the crank 31 and sprocket 72 are at rest to actuate the auxiliary feeding means including the belt 65 and move the severed print independently of the movement of the sensitive material in the focal plane. By this means, the operator is enabled to feed the exposed print 21ª safely out of the opening 11 before it becomes necessary to rotate the turn table 14 and bring into exposing position the opposite side of the stretch of film that is in the focal plane. This is done simply by giving the knob 78 a few turns before operating the crank 55 that rotates the turn table and roll holder.

I claim as my invention:

1. The combination with a camera body and a roll holder therein adapted to feed a sheet of double coated sensitive material through the focal plane of the camera, of means including a gear on said roll holder and a gear meshing therewith and operable from the exterior of the camera body for rotating said roll holder to present first one side and then the other side of the sensitive material to exposure.

2. The combination with a camera body and a rotary support therein, of a roll holder embodying film guides adapted to support a double coated film in the focal plane of the camera, said devices being carried on the rotary support to enable the film to be reversed and permit first one side and then the other to be exposed, means on the rotary support for feeding the film, male and female clutch elements, one mounted on said rotary support and operatively connected to said feeding means, the other being mounted on said body, driving means on the body having an operative connection with the clutch elements mounted thereon, a gear mounted on said rotary support concentric with the rotary axis thereof, and a pinion mounted on said body and meshing with said gear to turn said support.

3. The combination with a camera body and a rotary support therein, of a roll holder embodying film guides adapted to support a double coated film in the focal plane of the camera, said devices being carried on the rotary support to enable the film to be reversed and permit first one side and then the other to be exposed, means on the rotary support for feeding the film, means thereon for cutting the film, gear means mounted on said rotary support, and driving means mounted on the body for operating said gear means to turn said support from a position for exposing one side of said film to a position for exposing the opposite side of said film.

4. A photographic copying machine comprising a turntable mounted for rotation, roll holding means mounted on said turntable for holding a roll of photographic sheet material sensitized on both sides, supporting means also mounted on said turntable for holding a piece of said sensitized material from said roll in position to be exposed on one side when said turntable is in one position and to be exposed on the opposite side when said turntable is rotated to another position, a normally stationary light excluding casing substantially completely enclosing said turntable, roll holding means, and supporting means, and mechanism including a gear mounted on said turntable and an intermeshing gear mounted on said casing for rotating said turntable from the exterior of said casing while maintaining said casing stationary.

JOHN S. GREENE.